PROPORTIONAL AUTOMATIC FREQUENCY CONTROL CIRCUIT

Filed June 22, 1960 3 Sheets-Sheet 1

INVENTORS
MARVIN D. AASEN
JOHN D. ALBRIGHT
BY
H. H. Losche
ATTORNEYS

PROPORTIONAL AUTOMATIC FREQUENCY CONTROL CIRCUIT

Filed June 22, 1960 3 Sheets-Sheet 2

INVENTORS
MARVIN D. AASEN
JOHN D. ALBRIGHT
BY
H. H. Losche
ATTORNEYS

July 4, 1961 M. D. AASEN ET AL 2,991,426
PROPORTIONAL AUTOMATIC FREQUENCY CONTROL CIRCUIT
Filed June 22, 1960 3 Sheets-Sheet 3
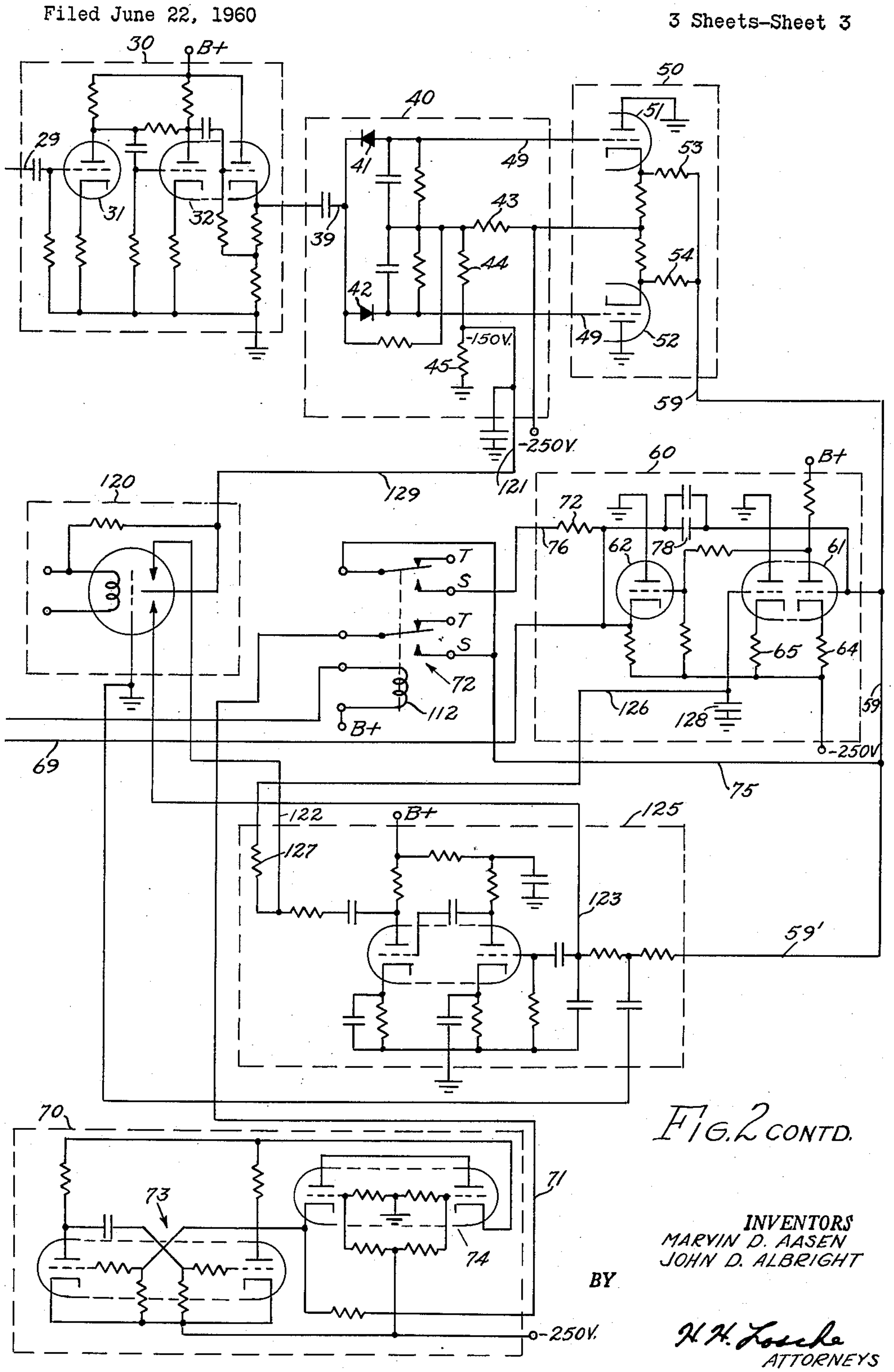
FIG. 2 CONTD.
INVENTORS
MARVIN D. AASEN
JOHN D. ALBRIGHT
BY H. H. Losche
ATTORNEYS

United States Patent Office 2,991,426

Patented July 4, 1961

2,991,426

PROPORTIONAL AUTOMATIC FREQUENCY CONTROL CIRCUIT

Marvin D. Aasen, Glen Burnie, and John D. Albright, Beltsville, Md., assignors, by mesne assignments, to the United States of America as represented by the Secretary of the Navy Filed June 22, 1960, Ser. No. 38,086
10 Claims. (Cl. 331—4)

This invention relates to automatic frequency control circuits of radio frequency communicating systems and more particularly to an automatic frequency control circuit which gives a correcting signal to the local oscillator proportional to the error signal amplitude in accordance with the polarity of the error signal resulting from deviations above or below a predetermined intermediate frequency.

An automatic frequency control circuit (AFC) is an arrangement for maintaining an essentially constant difference between the transmitter and local oscillator frequencies of a radio frequency communicating system, radar system, or the like, despite the effects of tendencies to shift these frequencies. In the conventional AFC systems the control circuit is of the "on-off" or hunting type in which the AFC system oscillates about some fixed frequency or value resulting in some constant fixed error. Because of the characteristic performance of such systems this "on-off" or hunting type system is seriously limited by low pulse rates and is erratic for high rates of transmitter modulation.

In the present proportional AFC system the error voltage signals or pulses are nulled out which eliminates the "on-off" or hunting over a constant fixed error as in the prior known conventional AFC systems. In the AFC system of this invention error voltage pulses are detected in the intermediate frequency (IF) amplifier and discriminator circuit by the discriminator of mixed signals coming from the AFC mixer as IF through the IF amplifier, and these error voltage pulses are pulse stretched in a pulse stretcher circuit and thereafter summed in a cathode follower summing circuit. The summed error voltage pulses are integrated for application to the repeller or reflector of the local oscillator, such as a klystron, to control the local oscillator frequency to maintain the above-mentioned constant difference between the transmitter and local oscillator frequencies. Since integrating amplifier circuits are notoriously known to drift, producing inaccurate integration of the voltage signals applied thereto, the integrator-amplifier in this invention must be stabilized. Further, the integrating circuit of this invention is biased to a fairly high negative level or reference potential to provide correction voltage at the required potential for proper klystron local oscillator repeller operation. Stabilization of the integrator circuit is accomplished with a high frequency synchronous vibrator or chopper circuit used in combination with an alternating current (A.C.) amplifier in a sample feedback loop of the integrator to stabilize the integrator at the reference potential. The stabilization is achieved at the reference potential, equal to the potential at which the local oscillator repeller is to operate, by referencing the chopper to the reference potential rather than to ground as is commonly done in similar stabilizing circuits. This automatically produces an integrator output at a potential near the correct value required for a klystron local oscillator. In order for the local oscillator to sweep the range of oscillations necessary to bring it to the constant difference between the transmitter and local oscillator frequencies, a square wave sweep multivibrator circuit applies square voltage waves through a relay switch to the input of the integrator to produce sawtooth sweep voltages on the repeller or reflector of the local oscillator. This causes the local oscillator to sweep a band of frequencies in which there is a frequency capable of producing the desirable constant difference between the transmitted frequency and local oscillator frequency, hereinafter referred to as the predetermined IF. A relay control circuit or "side circuit," tuned to the frequency band and side bands within limits of the predetermined IF, detects the limited IF band at the output of the last IF amplifier stage to produce a pulsed direct current (D.C.) control voltage. This control voltage is pulse stretched and applied to the relay control circuit to activate the relay switch to disconnect the square wave sweep multivibrator from the integrator circuit. The speed of this proportional AFC system, or the rate at which it can track a frequency error in terms of megacycles per second, is limited only by the rate of the information input or the pulse repetition frequency (PRF) of the radar system. The stretcher circuit in the AFC loop causes the loop gain to change directly with the radar PRF thereby producing greatly improved loop stability over the hunting AFC systems. The output correction voltage to the reflector of the local oscillator is the integral of the input error voltage pulses thereby producing a smoothing of the output correction voltage in a manner similar to higher order holding circuits. The integrator, being referenced to a D.C. voltage near the level which is required for the reflector of the local oscillator, automatically gives an output of correction voltage about the reference voltage value producing the required correcting function of the loop and the amount of loop gain which would otherwise be required. The automatic search and lock-on function of this invention operates substantially independently of the main AFC loop and therefore does not interfere in any way with the proportional control of the AFC system, yet their operation is co-ordinated to produce a complete proportional AFC system. It is therefore a general object of this invention to provide an automatic frequency control system for radio frequency communication systems which system controls the local oscillator frequency proportional to the amplitude of the intermediate frequency error voltage pulses above or below a predetermined intermediate frequency. It is also an object of this invention to provide a proportional automatic frequency control circuit by stabilizing integrated error voltage signals applied to the reflector circuit at a potential level required of the klystron local oscillator.

These and other objects and the attendant advantages, features, and uses may become more apparent to those skilled in the art as the description proceeds when taken in conjunction with the accompanying drawings, in which.

Figure 1:
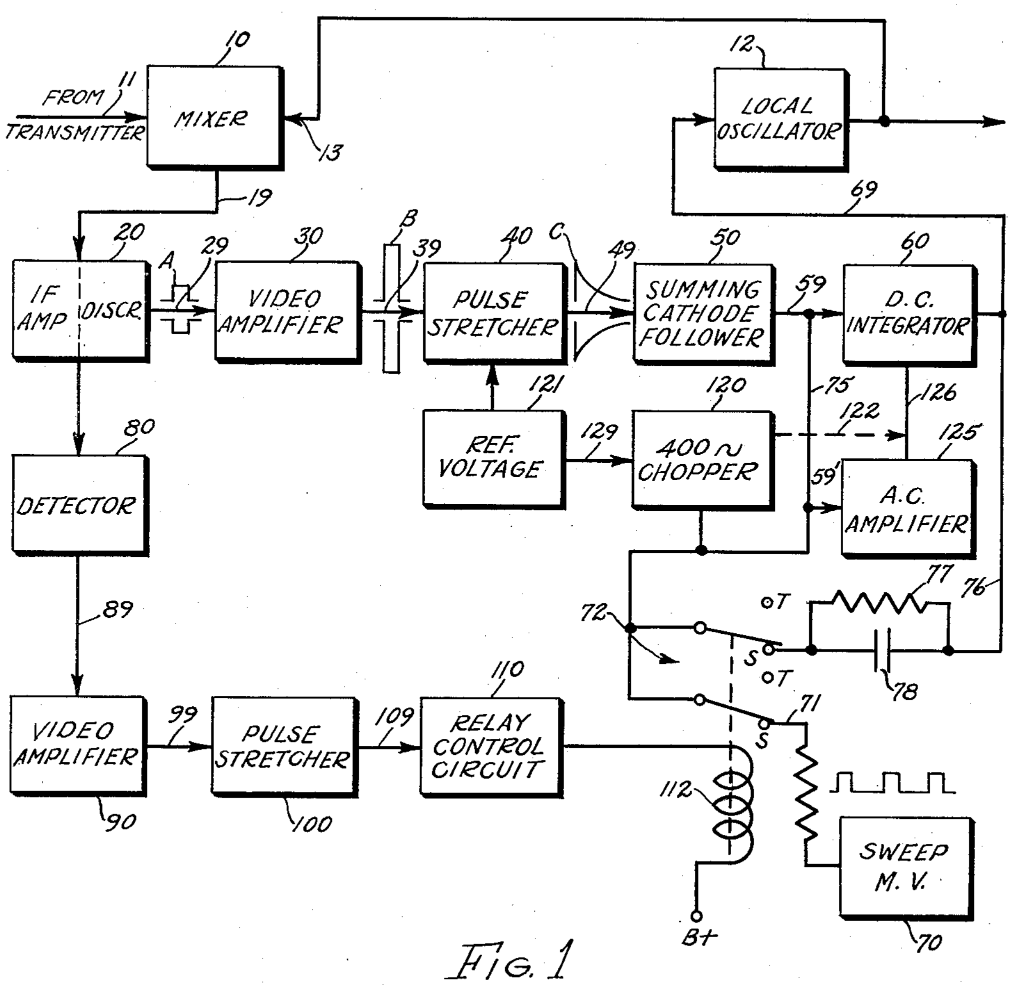
FIGURE 1 illustrates the proportional AFC system in a block circuit diagram.

Referring more particularly to FIGURE 1, there is shown the AFC mixer 10 having attenuated transmitter pulses applied thereto by way of conductor means 11 and the frequency from a local oscillator 12 applied thereto by way of conductor means 13. The AFC mixer produces an IF output on the conductor means 19 connected to an IF amplifier and discriminator circuit 20. The output of the discriminator circuit is by way of conductor means 29 through a video amplifier 30 over conductor means 39, through a pulse stretching circuit 40, and by way of conductor means 49 to cathode follower summing circuit 50. The output of the summing cathode follower circuit is by way of conductor means 59 to a direct current integrator circuit 60, the output of which is applied by way of condutcor means 69 to the reflector or repeller circuit of a klystron local oscillator 12, as is well understood by those skilled in the radio frequency (RF) communication art. The waveforms A, B, and C illustrate the positive or negative waveforms which are produced at the output of the discriminator circuit 20, video amplifier 30, and pulse stretcher circuit 40, in this AFC loop. As is well understood in the art, when the IF deviates from an IF amount determined to produce a desirable constant difference between the transmitted frequency and the local oscillator frequency, or in other words a predetermined IF, the discriminator circuit will produce positive or negative error voltage pulses proportional in amplitude to the IF deviation. If the IF is at the predetermined IF, the discriminator output voltage will be zero and thus no error voltage established. Where the IF tends to deviate from the predetermined IF by being above or below the frequency of this predetermined IF, positive or negative pulse waveforms A will be produced and used in the AFC loop to develop the correction voltage, this correction voltage being in proportion to the amplitude of the IF error voltage pulses.

Figure 4:
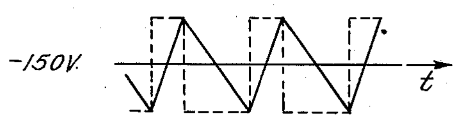
FIGURE 4 shows the integrator input from the sweep multivibrator circuit in broken lines and the integrated output of the sweep circuit voltage wavefroms.

In order to establish the AFC control the local oscillator 12 must first search or sweep a frequency range until it locates the frequency at which it is to operate to produce the predetermined IF. This is accomplished by a sweep multivibrator circuit 70 producing square voltage waves which are transmitted by way of conductor means 71 through a sweep-stop relay switch 72 and conductor means 75 to the input of the direct current integrator 60. When the system is first turned on, the relay switch is activated to the "S" or search position as shown in FIGURE 1. Each square voltage wave is integrated by the integrator circuit 60 to produce each sawtooth voltage, as illustrated in FIGURE 4, to produce a repeated vairable or sweep voltage on the local oscillator reflector until the relay switch is opened. The IF is detected by detector circuit 80 and applied by way of conductor means 89 through a video amplifier 90, through conductor means 99, through a pulse stretching circuit 100, and through a conductor means 109, to a relay control circuit 110. If the integrated sweep voltage from the sweep multivibrator 70 is applied to the repeller of the local oscillator 12, causing a sweep over a frequency band, the IF will approach the predetermined IF which will be detected in 80, and the detected control voltage applied through the relay control circuit 90, 100, and 110, to deactivate the relay switch 72 to return the switch blades to the contact "T" or frequency tracking position. Thereafter the AFC loop 20 through 60 will be operative to control the local oscillator and thus the IF of the system.

The D.C. integrator circuit is biased to a reference voltage to produce integrated correctional voltage on the output thereof of a potential level required by the klystron local oscillator 12 repeller or reflector for proper frequency control. In order to stabilize the integrator circuit 60 against drift, a high frequency synchronous vibrator or chopper circuit 120 is used in combination with an A.C. amplifier 125 to sample the integrator voltage level and feed back correctional stabilizing voltage to the integrator by the conductor means 126. In order for the chopper A.C. amplifier circuit to operate at the reference voltage necessary for the local oscillator repeller, the chopper is referenced to a reference voltage 121 equal to the bias produced by the reference voltage applied to the integrator circuit. The stabilizing functions of the chopper circuit and A.C. amplifier loop, as well as the AFC loop and relay switch circuit loop, will be better understood by reference to the detailed circuit description of FIGURE 2, infra.

Figure 5:
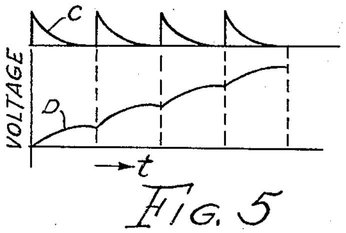
FIGURE 5 illustrates the integrator input and output of the stretched error signal voltage pulses applied thereto.
Figure 2:
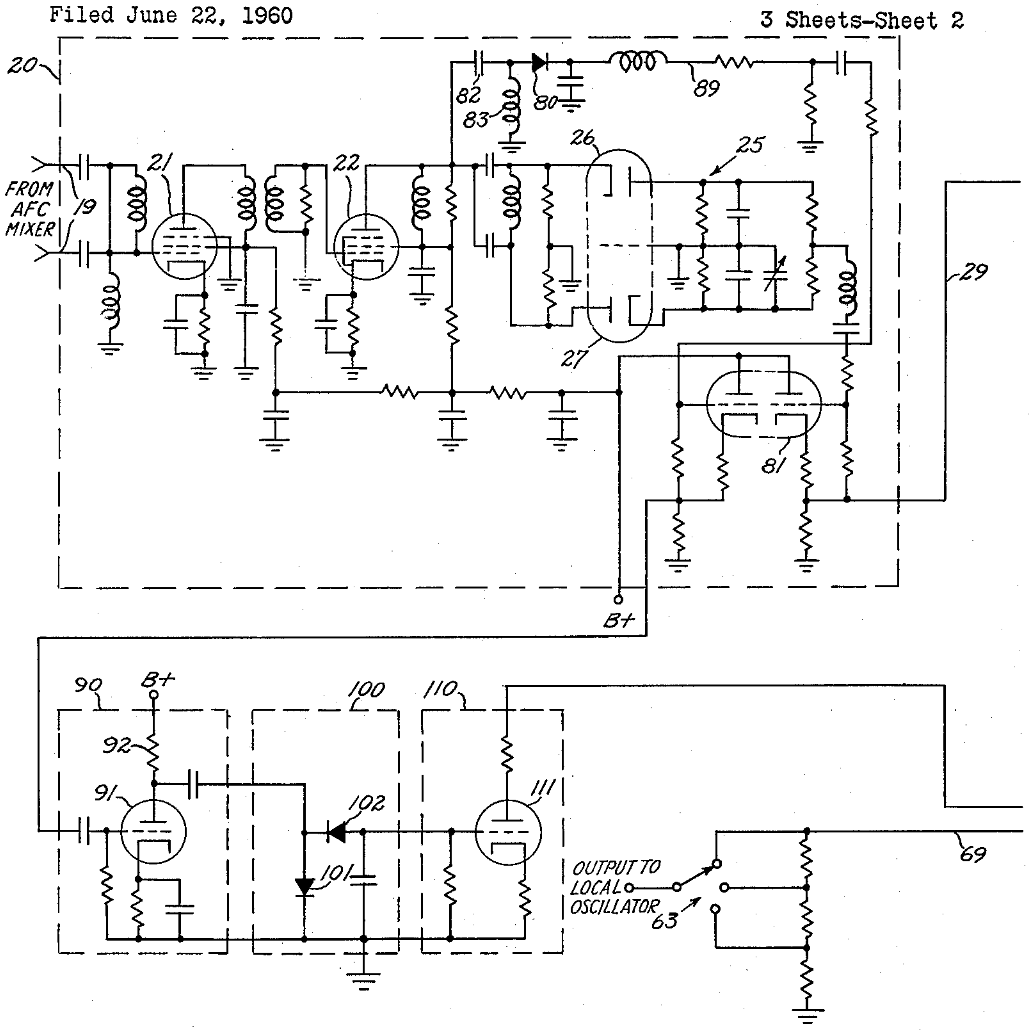
FIGURE 2 illustrates a preferred schematic circuit diagram of the principal parts of the block circuit diagram of FIGURE 1.

Referring more particularly to FIGURE 2, the IF coming by way of the conductor means 19 is amplified by the amplifier tube circuits 21 and 22 in the IF amplifier and discriminator circuit 20, the amplified IF being taken from the anode of the amplifier tube 22. The anode output of the IF on the anode of the IF amplifier 22 is applied to the diode discriminator circuit 25 wherein a pair of diodes 26 and 27 take the positive or negative swings of the IF to produce D.C. positive or negative pulses, respectively, over the conductor means 29 to the video amplifier 30. The video amplifier has two stages 31 and 32, the anode output of the second stage being applied through a cathode follower and capacitor coupled by way of the conductor means 39 to a pulse stretcher circuit 40. The pulse stretcher circuit 40 consists of a pair of crystal rectifiers 41 and 42 with related circuitry to pulse stretch the positive or negative D.C. pulses (as required) of the error voltage signal. The pulse stretcher circuit 40 is coupled through a pair of cathode follower summing tubes 51 and 52 and through summing resistors 53 and 54 in the summing circuit 50 to produce a summed voltage of the error signal pulses. The error signal voltage is passed by way of conductor means 59 to the grid in the right section of a double triode tube 61 in the integrator circuit 60. Integration is accomplished by the combination of the resistors 53, 54, and the capacitors 78, together with the double triode tube 61 amplifier. The pulse stretched pulses C are shown by waveform D in FIGURE 5 for the integrator 60 output. The integrator circuit 60 is biased to a reference voltage suitable to the local oscillator repeller requirements by virtue of the double triode tube 61 cathodes being coupled to a voltage source through the resistors 64 and 65. The output of the integrator double triode tube 61 is from the anode of the right section through a cathode follower tube 62, the cathode output being by way of the conductor means 69 through a range switch 63 to the local oscillator repeller in the local oscillator circuit 12. The above description establishes the AFC loop as shown in blocks 20 through 60 of FIGURE 1.

The sweep multivibrator circuit 70 consists of a double triode tube multivibrator circuit 73 and an amplitude clipper consisting of a double triode tube circuit 74. The sweep multivibrator circuit runs continuously while the system is turned on with the output conducted by way of conductor means 71 to one switch blade of the sweep stop relay switch 72. The search contact of the lower switch is coupled to the upper switch blade such that when the sweep-stop relay switch 72 is in the frequency search position "S" the square wave voltage output from the sweep multivibrator circuit 70 is conducted by way of the conductor means 71 and 75 to the grid of the right section of the integrator tube circuit 61 and also to the cathode output of the cathode follower tube 62 of the integrator circuit via conductor 76 through the resistor 77. This places resistor 77 in parallel with capacitors 78 to control integrator reset. The square waves of the sweep multivibrator circuit 70, as shown in dotted lines in FIGURE 4, will be integrated in the integrator circuit 60 to produce the sawtooth voltage waves shown in this figure on the output 69 to the reflector of the klystron local oscillator 12.

Figure 3:
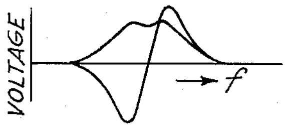
FIGURE 3 illustrates the envelopes of the detected side circuit and discriminator pulses of the discriminator illustrated in FIGURES 1 and 2.

The sweep stop relay switch 72 is controlled through the "side circuit" or control circuit loop from the IF amplifier circuit 20. The anode output of the last IF amplifier tube 22 is detected in a crystal rectifier 80 and the rectified IF conducted by the conductor means 89 through a cathode follower tube 81 to the grid input of a video amplifier tube circuit 90. The envelope of the detected "side circuit" and the discriminator pulses are shown in FIGURE 3. The output of the video amplifier tube circuit 90 is taken from the anode through a diode pulse stretching circuit 100 consisting of two diodes 101 and 102 in a manner well understood in the art. The output of the pulse stretcher circuit is conducted to the grid of a relay control tube 111 in the relay control circuit 100 which has its anode supplied through the relay coil 112 of the sweep-stop relay switch 72 to a B+ voltage. If, for example, the predetermined IF is established, at say 30 megacycles, and this IF comes within a range, of say 25 to 35 megacycles, the tuned circuit consisting of the capacitor 82 and the coil 83 will pass the IF to the detector circuit 80 and the detected voltage therefrom will be applied to the grid of the video amplifier tube 91. The video amplifier tube 91 is anode biased through an anode resistor 92 such that when the detected IF voltage control signal is applied to the grid of tube 91 the anode voltage will drop which signal is pulse stretched in the pulse stretching circuit 100 to drop the grid voltage on the relay control circuit tube 111 cutting off conduction in tube 111 and thereby de-energizing the relay switch 72. The de-energization of switch 72 will allow the switch blades to retract to the track position "T" as shown in FIGURE 2.

The high frequency chopper circuit 120, herein illustrated as a 400 cycle chopper, receives a reference voltage 121 via conductor 129 from a point in a voltage divider circuit 43, 44, 45 in the pulse stretcher circuit 40. While the voltage herein used as a reference voltage is purely for the purpose of illustrating the invention, this voltage is shown as a negative 150 volts since this is a good operating potential for the reflector or repeller of the klystron local oscillator. The chopper circuit output is conducted by way of conductor means 122 to the output of the A.C. amplifier circuit 125 and by way of the conductor means 126 to the grid of the left triode tube section of the tube 61 in the integrator circuit 60. The A.C. amplifier output is chopped at a reference potential of a minus 150 volts coming from the reference voltage 121 via conductor 129 to the chopper reed. The resistor 127 and the capacitor 128 operate to integrate the chopped voltage from the A.C. amplifier output which integrated voltage is applied to the left grid of the double triode 61. The integrated A.C. amplifier output, established by amplification of the error voltage signal from the input over conductor 59′, provides the correctional stabilizing voltage for the integrator circuit 60. The integrated correction voltage on the cathode output of the cathode follower tube 62 is conducted over the output conductor 69 at a voltage reference or center voltage of negative 150 volts. The correction voltage over the integrator output conductor 69 to the klystron local oscillator tube circuit 12 varies about the negative 150 center voltage. Where it is necessary to drop this center voltage, the switch 63 may be repositioned to other taps in the voltage divider circuit and thereby increase the control range of the klystron local oscillator tube.

*Operation*

In the operation of the proportional AFC system illustrated and described, when the system is turned on the relay circuit control tube 111 will initially conduct to energize the relay coil 112 to position the relay switch 72 in the search position "S." This immediately applies search voltages to the reflector or repeller of the klystron local oscillator tube 12 to vary the klystron repeller voltage in a sawtooth manner about the center voltage of negative 150 volts to produce a sweep of frequency over the conductor means 13 to the AFC mixer 10. As the local oscillator comes within, for example, 5 megacycles of the predetermined IF, herein taken as an example to be 30 megacycles, the detector 80 will detect this IF frequency and this detector output will be applied to the grid of video amplifier 90 to produce a voltage drop on the anode of tube 91 which drop in voltage is pulse stretched and applied to the grid of the relay circuit tube 111 rendering the relay tube nonconductive thereby releasing the relay to the track position "T." This operation of the proportional AFC system is called the tracking "lock-on" function whereby the local oscillator 12 will produce oscillations to maintain the IF on the output circuit 19 of the AFC mixer 10 at the prescribed 30 megacycles. As long as the IF in the output circuit 19 is maintained at the prescribed 30 megacycles, the discriminator output 29 will be zero, and consequently no error voltage is applied through the AFC loop 20 through 60 to change the control potential on the local oscillator 12. Any change which would tend to cause an increase or decrease in the IF at the output 19 of the AFC mixer 10 will cause the discriminator circuit 20 to detect this change in positive or negative error voltage pulses, depending on the increase or decrease, respectively, of the IF above or below the predetermined IF. The amount or degree of frequency change in the IF from the predetermined or prescribed 30 megacycles will be indicated by the amplitude of the error voltage pulses at the output 29 on the discriminator circuit shown by the waveform A. This error voltage will be amplified in the video amplifier 30 to produce a waveform illustrated by waveform B on the output 39. Each error voltage pulse is stretched at 40 to produce a waveform as illustrated by C on the output 49. These positive or negative stretched error voltage pulses are summed in the cathode follower summing circuit 50 and the summed error voltage is then integrated and amplified in the resistor 53, 54, capacitor 78, integrator circuit 60, to produce a substantially D.C. correction voltage on the output conductor 69 (see FIG. 5). This correction voltage is applied through the range switch 63 to the repeller or reflector of the klystron local oscillator tube in a direction to change the frequency of oscillations on the output 13 to the AFC mixer 10 to return the IF at the output 19 of mixer 10 to the predetermined or selected 30 megacycles. The chopper circuit 120 is in continuous operation to modulate the substantially A.C. sampled error signal voltage at the reference voltage level of negative 150 volts to stabilize the integrator circuit 60 at the error signal voltage and this reference voltage level. This reference voltage establishes the center voltage on the repeller or reflector of the klystron local oscillator 12 on which the integrated error voltage, or correction voltage, is superimposed. Since the integrated error or correction voltage is superimposed on this reference voltage, the local oscillator 12 is continuously corrected in its frequency output at the proper repeller potential to null any deviation from the predetermined IF on the output 19 of the AFC mixer 10. Also, the integrated error or correction voltage, superimposed on the reference voltage of the output 69 of the integrator circuit 60, is proportional to the integrated amplitude of the error voltage pulses A at the output of the discriminator circuit 20. The AFC loop 20 through 60 thereby operates to produce correctional voltage proportional to the amplitude of error voltage correction needed. The local oscillator will have the repeller or reflector bias changed to the extent occasioned by the correctional voltage to null the error voltage produced by deviations of the IF from the predetermined IF of 30 megacycles, given as an example. This operation of nulling the error voltage eliminates the possibility of any hunting or "on-off" frequency corrections as known in prior art devices. The relay control circuit for operating the frequency sweep voltage relay switch is taken from the IF amplifier and thus operates substantially independent of the AFC loop 20 through 60 thereby avoiding any error transient voltage produced from sweep-stop circuit operation. The pulse stretcher circuits 40 and 100 cause the loop gains in these two loops to change directly with the PRF applied by way of the conductor means 11 from the transmitter. This greatly increases the stability of these loops.

While many changes in constructional details and features may become apparent to those skilled in the art, in view of the illustrated preferred form shown and described herein, we desire to be limited only by the scope and spirit of the appended claims.

We claim:

1. A proportional automatic frequency control circuit in a system having a radio frequency communication means, a local oscillator, and a mixer for mixing the frequency of the communication means and the local oscillator to produce a predetermined intermediate frequency, and means responsive to deviations from said predetermined intermediate frequency for controlling the local oscillator frequency to maintain the predetermined intermediate frequency, the invention which comprises: a search multivibrator circuit for producing search voltages applied to said local oscillator driving the frequency thereof over a suitable frequency band; means responsive to the predetermined intermediate frequency and side bands thereof to remove said search voltages from said local oscillator; and a high frequency chopper circuit for chopping a stabilizing correctional voltage and applying same to the means responsive to deviations from said predetermined intermediate frequency for controlling the local oscillator frequency whereby the local oscillator frequency is controlled proportional to said deviations from said predetermined intermediate frequency.

2. A proportional automatic frequency control circuit in a system having a radio frequency communication means with a frequency controlling circuit utilizing the intermediate frequency from a mixer mixing the frequencies of the communication means and a local oscillator to be discriminated in a discriminator circuit and integrated in an integrator and applied to the local oscillator to control same thereby maintaining the intermediate frequency at a predetermined amount, the invention which comprises: means detecting said intermediate frequency about said predetermined amount to produce a voltage operable through a control circuit to open a switch means; a sweep generator coupled through said switch means and said integrator to apply search voltages to said local oscillator to produce oscillation over a frequency band; and a high frequency chopper circuit for chopping a stabilizing voltage and applying same to said integrator for stabilizing same against drift whereby correction of said intermediate frequency is proportional to the deviations of the intermediate frequency from said predetermined amount.

3. A proportional automatic frequency control circuit as set forth in claim 2 wherein said frequency controlling circuit includes a pulse stretching network between said discriminator circuit and said integrator thereby minimizing instability in said frequency controlling circuit, and wherein said switch control circuit includes a pulse stretcher network and a relay control circuit, and said switch means is a relay switch controllable by said relay control circuit.

4. A proportional automatic frequency control circuit as set forth in claim 2 wherein said high frequency chopper circuit includes an alternating current amplifier coupled to sample the discriminated intermediate frequency and to develop said stabilizing voltage therefrom.

5. A proportional automatic frequency control circuit in a superheterodyne communication system having an automatic frequency control circuit between the mixer and local oscillator including a discriminator and an integrator to control the local oscillator oscillations at a frequency to maintain a predetermined intermediate frequency, the invention which comprises: a pulse stretcher network in said automatic control circuit between said discriminator and said integrator to produce automatic frequency control circuit gain to change directly with the pulse repetition frequency of the communication system; a reference voltage applied to said integrator to place the operating potential thereof at the operating potential of said local oscillator; a search sweep generator coupled through the contacts of a relay switch to said integrator for producing local oscillator oscillations over a frequency band; a relay control circuit coupled to detect the intermediate frequency at about said predetermined intermediate frequency to control the conduction of current through said relay switch for breaking said contacts upon detection of intermediate frequency at about said predetermined intermediate frequency; and a high frequency chopper-amplifier circuit coupled to operate at said reference voltage for chopping a stabilizing voltage produced by said amplifier from sample voltage applied to said integrator and applying said stabilizing voltage to said integrator for stabilizing same against drift at said reference voltage whereby control of said local oscillator to maintain said predetermined intermediate frequency by correction voltages above and below said reference voltage is proportional to the deviations of said intermediate frequency above and below, respectively, of said predetermined intermediate frequency.

6. A proportional automatic frequency control circuit as set forth in claim 5 wherein said relay control circuit includes an amplifier and a pulse stretching network between the detector and said relay switch.

7. In a superheterodyne communication system having a hunting automatic frequency control circuit between the mixer and local oscillator including a discriminator and an integrator to control the local oscillator frequency in accordance with error voltage produced from deviations of the intermediate frequency from a predetermined intermediate frequency, the invention of a proportional automatic frequency control circuit comprising: a pulse stretcher network in said automatic frequency control circuit between said discriminator and said integrator to produce automatic frequency control circuit gain to change directly with the repetition frequency of the communication system; a reference potential applied to said integrator equal to the operating potential of said local oscillator; a sweep generator coupled through the contacts of a relay switch to said integrator for applying variable voltage thereto to cause said local oscillator to sweep a frequency band; a relay switch control circuit coupled between said mixer and said relay switch, said relay switch control circuit having a detector therein for detecting the intermediate frequency at about the predetermined intermediate frequency to activate said relay switch to break said contacts thereby producing lock-on of said local oscillator to a frequency to maintain said predetermined intermediate frequency at the output of said mixer; an alternating current amplifier coupled to said integrator to sample said error voltage at said reference potential to produce stabilizing voltage therefrom; and a high frequency chopper circuit biased to said reference potential for chopping said stabilizing voltage at the operating potential of said local oscillator for stabilizing the integrated output correction voltage at said reference voltage level whereby control of said local oscillator to maintain said predetermined intermediate frequency by correction voltage above and below said reference potential is proportional to the amplitude of said error voltage above and below a voltage representative of said predetermined intermediate frequency.

8. A proportional automatic frequency control circuit as set forth in claim 7 wherein said local oscillator is a klystron and the output of said integrator is coupled to the klystron repeller.

9. A proportional automatic frequency control circuit for radar communication and detection systems comprising: a local oscillator and a mixer for mixing the oscillations from said local oscillator and a radar transmitter to produce an intermediate frequency; an automatic frequency control circuit coupled from the output of said mixer to the control input of said local oscillator, said circuit including an intermediate frequency amplifier, discriminator, pulse stretcher, summing cathode follower, and direct current integrator, in that order, to control the frequency output of said local oscillator in accordance with intermediate frequency error voltage produced by discrimination of said intermediate frequency deviations from a predetermined intermediate frequency; a square wave generator coupled through contacts of a relay switch to the integrator input for producing sawtooth voltage on said control input of the local oscillator to produce a frequency search over a frequency band; a sweep control circuit coupled between said intermediate frequency amplifier and said relay switch, said sweep control circuit including a detector, pulse stretcher, and a relay switch control circuit, in that order, for activating said relay switch to break said contacts when said intermediate frequency is about said predetermined intermediate frequency to produce lock-on of said local oscillator to a frequency generation providing said predetermined intermediate frequency at the output of said mixer; an alternating current amplifier coupled to sample said error voltage and to amplify same for a stabilizing voltage; and a chopper circuit for chopping said stabilizing voltage, said chopped stabilized voltage being applied to said direct current integrator to stabilize same and to apply the integrated error voltage to said control input of said local oscillator whereby control of said local oscillator to maintain said predetermined intermediate frequency is proportional to the amplitude of said intermediate frequency error voltage.

10. A proportional automatic frequency control circuit as set forth in claim 9 wherein said pulse stretchers are diode pulse stretchers producing a gain in said automatic frequency control circuit and said sweep control circuit changing directly with the pulse repetition frequency of oscillations from the radar transmitter.

No references cited.